June 7, 1955  S. C. CARTER  2,710,017
VALVE
Filed March 31, 1950  2 Sheets-Sheet 1
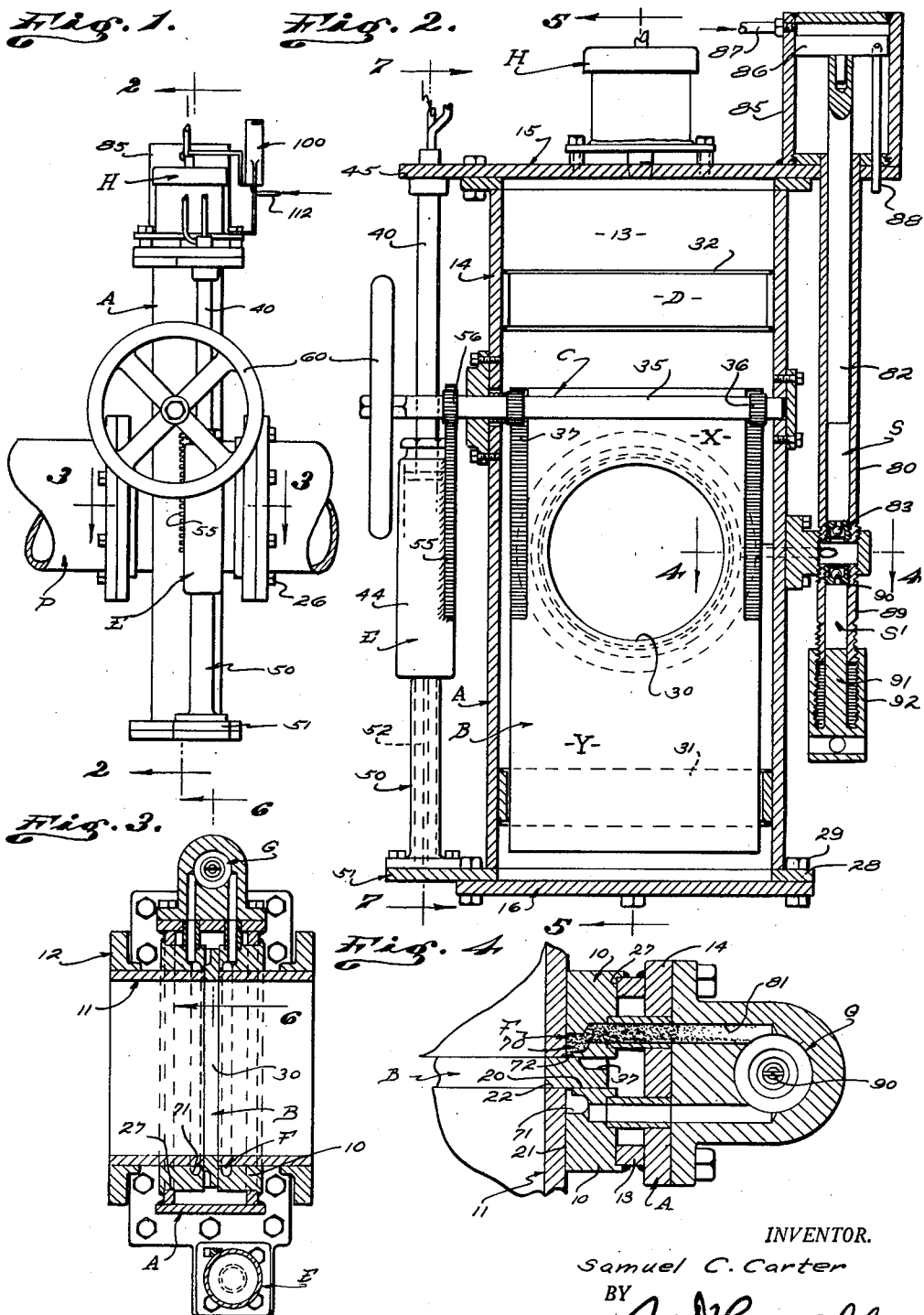
INVENTOR.
Samuel C. Carter
BY
Attorney

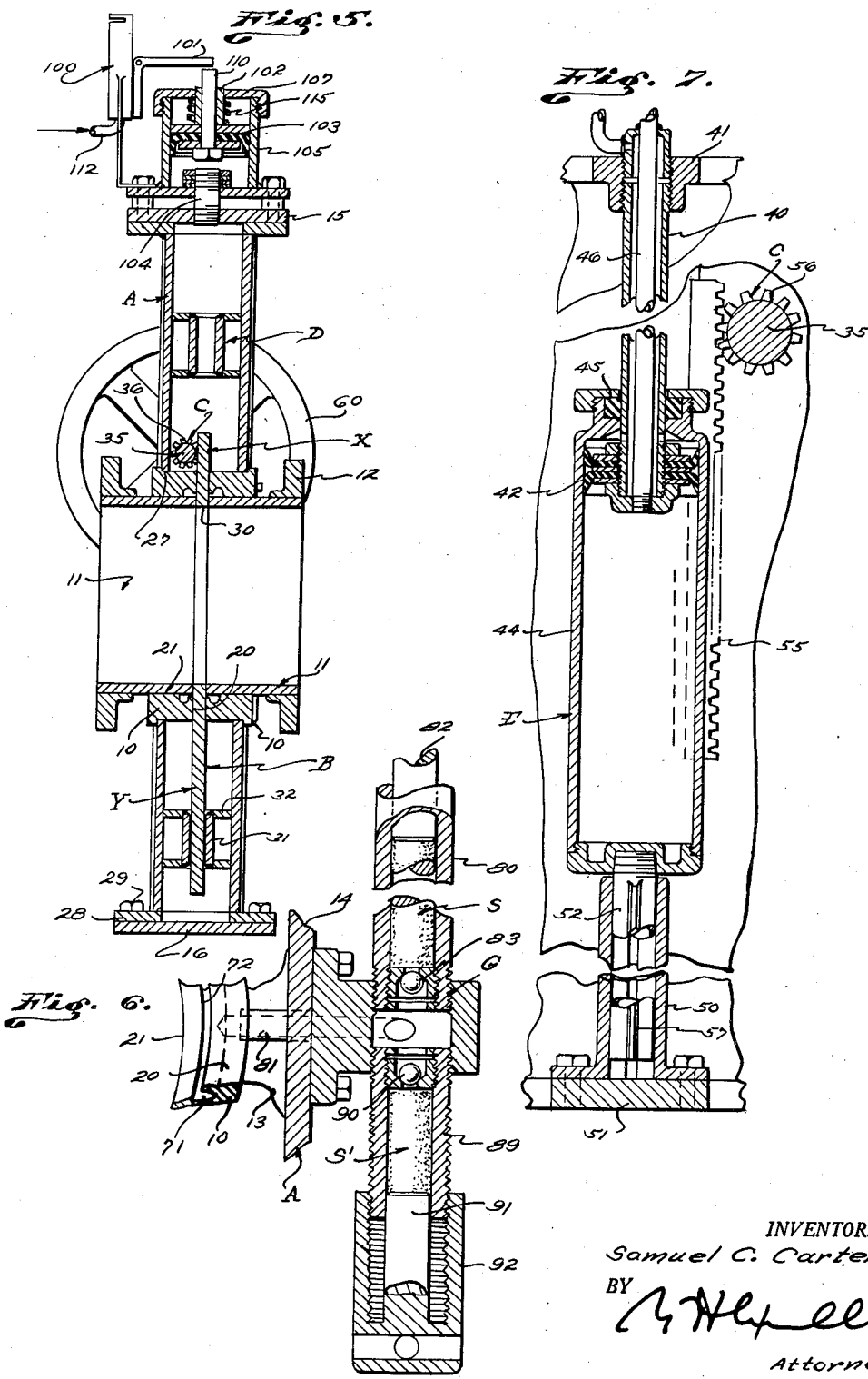

United States Patent Office 2,710,017
Patented June 7, 1955

2,710,017
VALVE

Samuel C. Carter, Glendale, Calif., assignor to Duoseal Company, Inc., Los Angeles, Calif., a corporation of California Application March 31, 1950, Serial No. 153,039

4 Claims. (Cl. 137—246.11)

This invention is concerned with a valve and relates particularly to a valve of the type in which a sliding plate controls flow. It is a general object of the invention to provide a valve of the general character referred to characterized by simple, inexpensive, general construction and which is particularly practical for handling fluids, generally, and particularly gas.

The structure embodying the present invention involves, generally, a body which is fabricated, being formed of two spaced rings with tubes attached thereto and projecting in opposite directions therefrom coupling elements or flanges on the outer ends of the tubes, side plates which are flat and parallel and which are attached to or carried by the rings, edge plates extending between and connecting the longitudinal edges of the plates and end plates closing the end of the box-like structure formed by the side plates and edge plates.

A valve element operates in the body and is characterized by an imperforate end and an apertured end, the plate being cooperatively related to or operating between the rings of the body. Guide means are provided in the body guiding the valve plate relative to the rings and operating means is provided for shifting the plate relative to the rings. The operating means involves a rack and pinion mechanism, pinions being provided on a shaft that enters the body and has one end accessible at the exterior of the body. The pinions mesh with racks on the valve plate. An actuator for the operating means involves a fluid pressure actuated mechanism characterized by a piston anchored through a piston rod and a cylinder cooperating with the piston. A drive between the cylinder and shaft involves a rack on the cylinder engaging a pinion on the shaft at the exterior of the body. A fluid inlet introduces fluid to or drains it from the cylinder and is preferably a duct extending through the tubular piston rod carrying the piston. A suitable means maintains the cylinder in rotative position so that the rack on the cylinder is maintained in engagement with the pinion on the exterior portion of the shaft.

A sealing means is provided sealing between the rings and the valve plate. The sealing means involves annular bodies of plastic or malleable sealing material in channels in the rings and so carried by the channels as to issue through narrow openings between the channels and tubes, so that the issuing parts engage the sides of the valve plates. A feed means feeds the sealing material to the channels and preferably involves a feed cylinder carrying a supply of sealing material, a ram operating in the cylinder, a duct from the cylinder to the channels and a check valve controlling flow between the cylinder and duct. A fluid pressure actuated means operates the ram and an indicator shows the condition of the parts just named. An indicating means is provided to indicate the pressure condition within the body and involves an audible signal, preferably a whistle, and a visible indicator, which indicator operates or controls the whistle and is operated by an element such as a piston actuated by pressure from the chamber or interior of the body.

It is a general object of the invention to provide a valve of the general character hereinabove referred to in which the body is of unique construction and formation, the structure being such as to involve but few simple, easily formed and inexpensive parts and being highly effective and practical for the handling and accommodation of other elements of the structure.

Another object of the invention is to provide a single, practical and improved gate valve construction in which a dependable seal is established and maintained by means of a granular sealing material that is compressible and resilient and thus acts by itself to seal under conditions under which ordinary packing materials would fail.

Another object of this invention is to provide a unique operating means serving to effectively and conveniently operate the shiftable plate of a valve from the exterior of the valve body either by fluid pressure or manually.

It is a further object of the invention to provide a simple, unique and effective fluid pressure actuated means for a valve operating means serving to shift the valve plate of a valve structure of the general character referred to.

A further object of this invention is to provide a simple, effective, reliable sealing means and feed therefor by which a valve plate may be easily and dependably sealed in a body following positioning of the plate in the desired manner in the body.

Another object of the invention is to provide a simple, effective and dependable means serving to indicate the pressure condition prevailing within the valve body, thus revealing the condition of the packing or sealing means. The indicator provided by the invention is such that if the sealing means leaks so pressure develops in the body a signal is given, enabling the operator to know the condition.

The various objects and features of my invention will be fully understood from the following detailed description of a typical preferred form and application of the invention, throughout which description reference is made to the accompanying drawings, in which:

Fig. 1 is a side elevation of a valve structure embodying the invention. Fig. 2 is an enlarged vertical or transverse sectional view of the structure, being a view taken as indicated by line 2—2 on Fig. 1. Fig. 3 is an enlarged plan section taken as indicated by line 3—3 on Fig. 1. Fig. 4 is an enlarged plan view taken as indicated by line 4—4 on Fig. 2. Fig. 5 is a vertical sectional view taken as indicated by line 5—5 on Fig. 2. Fig. 6 is an enlarged fragmentary view taken as indicated by line 6—6 on Fig. 3, and Fig. 7 is an enlarged detailed sectional view taken as indicated by line 7—7 on Fig. 2.

The structure embodying the present invention involves, generally, a body A, a shiftable valve element B, operating means C for the element B, guide means D for the valve element, an actuator E for the operating means, sealing means F sealing between the body and the valve element, feed means G for the sealing means, and indicating means H indicating the pressure condition prevailing within the body A.

The body A constructed as provided by the present invention involves, generally, two spaced rings 10, tubes 11, coupling elements 12 on the outer ends of the tubes 11, side plates 13 attached to or carried by the rings 10, edge plates 14 extending between and connecting the side plates, and upper and lower end plates 15 and 16, respectively.

The rings 10 are preferably formed with flat opposed inner ends 20 between which the valve element B operates. The rings are carried by or related to the other elements of the body to be spaced apart so that the valve plate will slidably operate between them. The rings have central openings or bores 21 that receive the inner end portions of the tubes 11 so that the flat inner ends 22 of the tubes are in the planes of the ends or faces 20 of the rings. This construction is clearly illustrated in Fig. 4.

The tubes 11 carried by or holding the rings 10 project in opposite directions or outwardly from the rings 10 and have the coupling elements 12 located on their outer ends. The particular coupling elements 12 illustrated in the drawings are coupling flanges by which the valve can be connected to pipe sections P or the like, as by suitable bolts or screw fasteners 26.

The side plates 13 are flat parallel plates elongate in form and they are provided with openings 27 in which the rings 10 are received. The openings 27 are located substantially midway between the ends of the side plates and the side plates are in parallel planes and are spaced apart a substantial distance, as will appear from examination of Fig. 5 of the drawings.

The edge plates 14 are preferably flat elongate plates that join to and extend between the longitudinal edges of the side plates 13 and they are coextensive with the plates 13. In the preferred form of the invention the rings, tubes, coupling flanges, side plates and edge plates hereinabove referred to are all permanently or integrally joined, as by welding material, so that these parts form a rigid permanent unit.

The end plates 15 and 16 close the ends of the box-like body formed by the parts above described, and in practice it is preferred that they be separable from the other parts of the body. In the drawings the end plates are shown coupled to end flanges 28 provided on the ends of the side and edge plates, the end plates being secured in position by suitable releasable fasteners 29.

The valve element B is preferably a simple elongate plate which is flat and characterized by end portions X and Y, the end portion Y being imperforate while the end portion X is provided with a suitable opening or aperture 30. The valve plate operates between the rings 10 of the body and can be moved between a position where the imperforate end portion Y closes the passage between or through the rings and a position where the aperture 30 registers with the rings allowing full free flow through the structure.

The guide means D guides the valve plate B in the body A for the movement above described, and in the case illustrated the guide means involves guides 31 that engage the valve plate and are supported at opposite sides of the plate from the side plates 13 through suitable mountings 32. Guides 31 are located in opposite directions from the rings 10 of the body and are so spaced from the rings that the valve plate is at all times guided between the rings and guides in one direction or the other from the rings.

The operating means C is provided for shifting the valve plate B in the body in the manner above described. In the form of the invention illustrated the means C involves a shaft 35 carried by the body A so that it has a portion within the body and a portion at the exterior of the body. In the case illustrated the shaft is supported by and between the edge plates 14 to be located in the body at one side of the valve plate. Operating pinions 36 are provided on the shaft 36 within the body and have driving engagement with racks 37 fixed on the valve plate. From Fig. 2 of the drawings it will be observed that the racks 37 are located at each side of the aperture 30 provided in the valve plate so that when the shaft 35 is rotated by suitable means from the exterior of the body the valve plate operates or shifts smoothly within the body and may be operated to any desired position in the body.

The actuator E for the operating means C is a fluid pressure actuated mechanism at the exterior of the body A and in the case illustrated it involves a cylinder and piston mechanism having one element stationary relative to the body while the other is shiftable relative thereto. In the case illustrated the piston element is stationary and has a rod 40 anchored to an extension or bracket 41 on the upper end plate 15, the piston head 42 being carried on the lower end of the rod 40.

The cylinder element 44 slidably carries the piston 42 and has an opening in one end passing the rod 40 and carrying packing 45 that seals around the rod. A fluid inlet 46 is provided for introducing fluid into or draining it from the cylinder 44, and in the arrangement illustrated it is in the form of a tube that extends through the tubular piston rod 40. A suitable fluid connection in the fluid handling tube 46 admits fluid to and passes it from the lower end of the cylinder or from the cylinder 44 below the piston 42, while the piston rod 40 is such as to pass fluid to and from the cylinder 44 above the piston. It will be apparent that by providing suitable fluid control means for supplying fluid to or draining it from the piston rod and tube 46 the mechanism just described can be operated to shift the cylinder 44 in either direction longitudinally of the body structure.

A guide means is provided for guiding the cylinder 44 and is preferably located at or beyond the end of the cylinder 44 remote from the rod 40. In the case illustrated the guide means involves a tubular guide 50 anchored to or carried by a bracket 51 projecting from the lower end portion of the body A and a stem 52 is attached to the lower end of the cylinder 44 to depend therefrom and to be slidably carried in the guide 50.

A suitable drive means or drive connection is provided between the cylinder 44 and the shaft 35 and the means C. The particular drive illustrated in the drawings involves a rack 55 fixed on the exterior of the cylinder 44 and extending longitudinally thereof, the rack being engaged with a pinion 56 fixed on the projecting end portion of shaft 35. A suitable means is further provided for maintaining the cylinder 44 in a fixed rotative position so that the rack 55 is maintained in engagement with the pinion 56. The particular means shown in the drawings involves a sliding connection or key 57 between the fixed guide 50 and the stem 52 depending from the cylinder 44.

In practice it is preferred to provide a suitable manual operating means by which the shaft 35 can be operated manually if desired. In the case illustrated a manually operated hand wheel 60 is shown fixed on the projecting end portion of shaft 35.

Sealing means F acts to seal between the valve plate B and the rings 10 of the body A and involves annular bodies 70 of plastic, or flowable, sealing material that is resilient and subject to some compression. The annular bodies 70 of sealing material are preferably carried in channels 71 provided in the rings 10 facing the bores 21 that hold or carry the tubes 11. The construction is such that narrow outlet openings or passages 72 are provided in the faces 20 of the rings 10 so that the packing material can issue from the rings in a manner to engage and effectively seal against the faces of the valve plate. In practice the packing material 70 may vary widely in form or character, it being preferred in most cases to employ packing that is plastic or somewhat malleable in form, which involves a metal, which is resilient and somewhat compressible, and which may be made to flow by the application of suitable pressure thereto. Such a packing may be made of flakes of lead, or the like, finely divided rubber-like material, and a binder such as castor oil.

From the drawings it will be observed that the annular channels 71 provided in the rings 10 of the body surround the bores or openings 21 provided through the rings, so that continuous annular seals occur around the valve plate at both sides thereof. In practice when a packing material of the character described is used and is forced to issue through the passages 72 a lead seal is established and maintained.

The feed means G provided for feeding sealing material to the annular channels 71 to make up for material that may be lost or which may escape through the passages 72, is preferably located at the exterior of the body and in the structure illustrated it involves a cylinder 80 carrying a supply S of sealing material, a suitable system of ducts or ports 81 connecting the cylinder 80 with the channels 71, and a ram 82 operating in the cylinder 80 to act on and force the material in the cylinder through the ports 81 to the channel 71. A suitable check valve 83 is provided to prevent return flow from the ports 81 into the cylinder and a suitable means is provided for power operation of the ram. In the case illustrated a fluid pressure operated ram operator is illustrated and involves a cylinder 85 fixed on the upper end 15 of the body and receiving the ram 82. A piston 86 is fixed on the ram in the cylinder 85. A suitable fluid inlet 87 is provided for introducing operating fluid into the cylinder 85 above the piston 86 and an indicator 88 is attached to the piston 86 and projects from the structure just described to visibly indicate the position of the piston in the cylinder.

It is preferred, in practice, to provide a manual feeding means to supplement or serve in place of the structure just described and this may include a cylinder 89 in communication with the ports 88 through a check valve 90 and carrying a supply S' of sealing material. A ram 71 operates in the cylinder 89 and can be operated by a cap 92 threaded to the cylinder 89, which cap is accessible for manual operation.

The indicating means H is provided to indicate the pressure occurring or prevailing within the body A. In the preferred form of the invention the means H involves an audible signalling device or whistle 100 operable by means of a pivoted lever 101, and a visible indicating element 102 is also provided. In the case illustrated a fluid actuated element in the form of piston 103 is in communication with the interior of the body A through a suitable duct 104, the piston 103 being carried in a cylinder 105. The visible indicator 102 is operated by the piston 103 and projects from the head 107 of the cylinder 105. An operating stem 100 projects from piston 103 and operates the lever 101 that controls the whistle. A pressure supply line 112 is connected to the whistle and normally maintains operating fluid or air under pressure at the whistle so that the whistle signals when the lever 101 is operated. With the construction just described, as pressure develops in the body A the piston 103 is operated or moved upwardly against the resistance of spring 115 and the position of the piston can be determined by observing the indicator 102, and attention is called to the presence of pressure in the body by the operation of the whistle 100.

From the foregoing description it will be apparent that the invention provides a structure that is inexpensive of manufacture, which is simple and dependable in operation, and which is particularly practical for handling gas or the like. In the case of a valve of the character described being used to handle gas the structure is such as to operate satisfactorily in spite of the presence of dust and foreign matter that commonly occurs in gas lines and which is such as to cause unsatisfactory or improper operation of most valve mechanisms employed in such lines.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A valve including, an elongate flat apertured valve plate, a body defining an elongate closed chamber and slidably carrying the valve plate enclosed in the chamber a central flow passage in the body intermediate the ends of the chamber, means adapted to operate the plate including, a shaft entering the chamber of the body, a first pinion on the shaft within the chamber of the body, and a fixed rack on a face of the valve plate and extending longitudinally of the valve plate and engaged by the pinion, and an actuator for said means located at the exterior of the body and including a cylinder and piston mechanism, a second pinion on the shaft at the exterior of the body, and a rack meshing with said second pinion and connected with said mechanism to be operated thereby.

2. A valve including, an elongate flat valve plate with an aperture at one end, a body defining an elongate closed chamber and slidably carrying the valve plate a central flow passage in the body intermediate the ends of the chamber, means adapted to operate the plate including, a shaft entering the body from one side thereof, a pinion on the shaft within the chamber, and a fixed rack on a face of the valve plate and engaged by the pinion, and an actuator for said means located at the exterior of the body adjacent one side thereof and including a piston fixed relative to the body, and extending parallel with the valve plate, a cylinder carried by the piston and shiftable relative thereto, and a rack and pinion drive from the cylinder to the shaft.

3. A valve including, an elongate valve plate with an aperture at one end, a body slidably carrying the valve plate and defining an elongate chamber enclosing the valve plate, a flow passage extending through the body midway between the ends of the chamber therein, means adapted to operate the valve plate including, a shaft extending in a direction transverse and parallel with the plane of the valve plate and entering the chamber in the body, a pinion on the shaft within the chamber, and a rack on the valve plate extending longitudinally thereof and engaged by the pinion, and an actuator for said means located at the exterior of the body adjacent one side thereof and including a piston fixed relative to the body and extending parallel with the valve plate, a cylinder carried by the piston and shiftable relative thereto, guide means fixed relative to the body and guiding the cylinder from the body for reciprocating movement parallel with the valve plate, a rack on the exterior of the cylinder, and parallel with the cylinder, a pinion on the shaft engaged by the rack on the cylinder, and means maintaining the last mentioned rack and pinion permanently engaged including a key and keyway at the guide means.

4. In a valve having a body with a flow passage extending therethrough, an elongate flat valve element with an aperture at one end carried by the body to shift relative thereto and extend transverse the flow passage therein, and annular grooves in the body to oppose the opposite side of the valve element and surrounding the flow passage and filled with plastic sealing material carried, feeding means at the exterior of the body supplying said plastic sealing material to said annular grooves and including, a single duct communicating with both of said annular grooves, two supply cylinders, an operating ram in each supply cylinder, fluid pressure actuated means including a cylinder and piston operating one of the rams, and screw threaded manually operated means operating the other ram.

References Cited in the file of this patent

UNITED STATES PATENTS

| | | | |
|---|---|---|---|
| 1,000,588 | Cummings | Aug. 15, | 1911 |
| 1,341,319 | Hodges | May 25, | 1920 |
| 1,371,308 | Hiller | Mar. 15, | 1921 |
| 1,483,041 | Brooks | Feb. 5, | 1924 |
| 1,492,856 | McCurdy | May 6, | 1924 |
| 1,535,099 | Burns | Apr. 28, | 1925 |
| 1,721,737 | Joyce | July 23, | 1929 |
| 1,727,628 | Baker | Sept. 10, | 1929 |
| 1,842,056 | Westling | Jan. 19, | 1932 |
| 2,028,093 | La Mont | Jan. 14, | 1936 |
| 2,085,688 | Schuchman | June 29, | 1937 |
| 2,200,310 | Thayer | May 14, | 1940 |
| 2,229,871 | Penick | Jan. 28, | 1941 |
| 2,233,395 | Blanchard | Mar. 4, | 1941 |
| 2,308,399 | Strecker | Jan. 12, | 1943 |
| 2,316,933 | Chaplin | Apr. 20, | 1943 |
| 2,501,946 | Jacobsen | Mar. 28, | 1950 |
| 2,504,496 | Carter | Apr. 18, | 1950 |